April 21, 1964     K. R. KESKA     3,130,290
ROTARY WELDING TRANSFORMER

Filed Jan. 4, 1961     3 Sheets-Sheet 3

INVENTOR.
KENNETH R. KESKA
BY
Oberlin, Maky & Donnelly
ATTORNEYS

United States Patent Office 3,130,290
Patented Apr. 21, 1964

3,130,290
ROTARY WELDING TRANSFORMER
Kenneth R. Keska, Bay Village, Ohio, assignor to The Yoder Company, Cleveland, Ohio, a corporation of Ohio
Filed Jan. 4, 1961, Ser. No. 80,567
12 Claims. (Cl. 219—63)

The present invention relates to rotating welding transformer construction and has for a primary object the provision of a vapor-cooled transformer of this type.

The extraction and dissipation of the heat generated in operation of such a transformer has generally been accomplished by means of a closed water cooling system defined in part by tubes and passages within the transformer structure. This internal circuit is coupled through rotatable connections of suitable form to the external remainder of the system, with the latter including the usual pump, heat exchanger and storage means. While such systems have been designed with care, in appreciation of the potential damage which could be caused by free water in the transformer, the mere presence of such a coolant and its circulation through the structure prevents complete elimination of all risk on such account, and there is always the danger that leakage of water may occur at some internal part of the system with consequent damage to the transformer insulation and the possibility of electrical shorting. Moreover, the use of cooling tubes and the like, necessary in such a conventional system, may in some cases serve to condense atmospheric water vapor on the exterior surfaces thereof, so that there may be a water hazard even without actual leakage, and there is the further risk that the inner circuit may become restricted or clogged to the extent the system becomes ineffective to prevent overheating of the transformer and damage on such account; loss of water at the rotatable connections to the transformer, such as by loosening of the same, would likewise impair the efficiency of the system. In other words, while closed water systems are feasible and have, in fact, been employed for some time for the cooling of a rotary welding transformer, they require critical attention, are fairly complicated, and the best efforts can simply minimize the risks inherent in their use.

As first indicated above, the primary object of the present invention is to provide a vapor-cooled rotating welding transformer, and this more particularly relies on vaporization of an inert liquid contained within the transformer enclosure to extract the heat generated in its operation, condensation of the vapor thus produced at a particular part of the structure, and dissipation of the heat of condensation from such part.

In contrast to the conventional water system discussed, the transformer according to the present invention is hermetically sealed, with a drum surrounding the core-winding assembly and containing a fixed charge of an inert liquid suitable for vapor cooling as set forth. The transformer is adapted for mounting with its axis substantially horizontal, the entire assembly rotating on such axis, and provision is made to ensure that the desired cooling by vaporization is carried out with best efficiency in such distinct structure.

The new vapor-cooled transformer clearly affords a very substantial simplification of the apparatus and eliminates the risks which will always be present in a system requiring the circulation of water through the transformer. The hermetic sealing of the improved rotary welding transformer not only prevents loss of the heat transfer liquid, but also protects the transformer, and such liquid, from fumes, dust, and other air-borne impurities. The drum construction further adds to the physical strength of the assembly and makes the same more resistant to possible damage as the result of externally applied forces.

A transformer of the type involved includes electrodes or electrode rings for contact application of the transformer output current to the work to be welded, such as a tube blank, and to the transformer secondary terminals. An additional object of the invention is to provide such a transformer containing a fixed charge of an inert vaporizable liquid as aforesaid in which the conductor assembly extending from the transformer proper to the work electrodes is also cooled in the same manner, with further provision made for circulating a portion of the liquid through such conductor assembly for this purpose.

It is also an object of the invention to provide such a vapor cooled rotary welding transformer having self-contained pump means for forced circulation of the liquid through the conductor assembly which supplies the working current to the electrodes.

An additional object of the present invention is to provide a vapor-cooled rotating welding transformer the operation of which is determined at least in part by a control system responsive to the temperature and pressure conditions within the transformer enclosure.

Othere objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
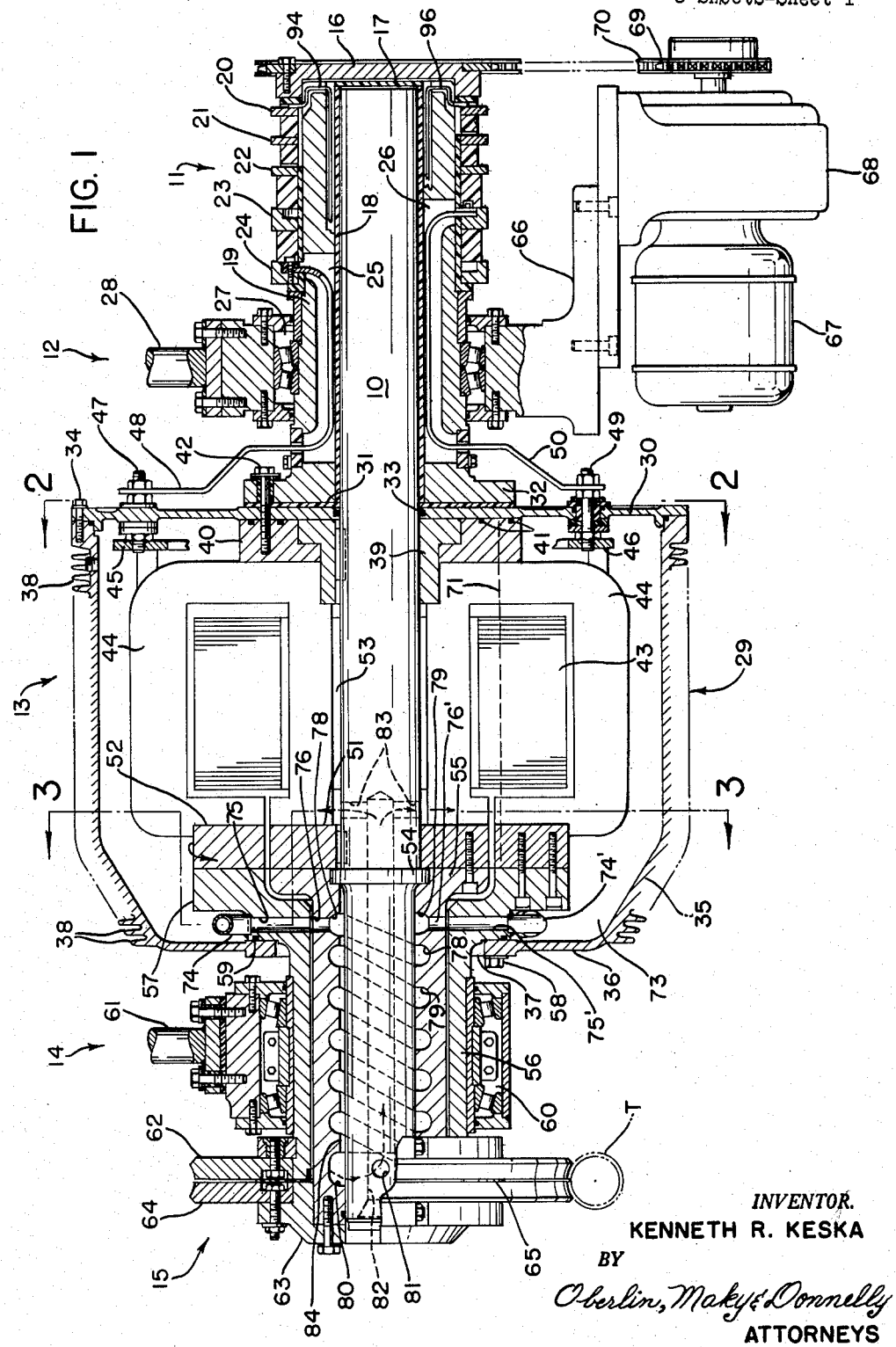
FIG. 1 is a longitudinal section of a rotating welding transformer in accordance with the present invention.

Referring now to the drawings in detail, the illustrated rotating welding transformer comprises a center shaft 10 forming the main support for the assembly the operative sections of which are, beginning at the right end in FIG. 1, an electrical contact section 11, a rear external support 12, the transformer proper 13, a front support and conductor sub-assembly 14, and an electrode section 15.

For a purpose to be described, a sprocket 16 is attached to the rear end of the shaft 10, with an insulating spacer 17 interposed between the two. An insulating sleeve 18 surrounds the adjoining end portion of the shaft, and a rear trunnion 19, coextensive with such insulating sleeve, is fitted over the latter. Three electrical contact rings 20, 21 and 22 are mounted in longitudinally spaced relation on the outer or rear end portion of such trunnion insulated from the same and from each other, and two similarly insulated current supply rings 23 and 24 encircle the trunnion 19 inboard of the contact ring series. It will be understood that the several such rings are adapted respectively to be engaged by brushes, shown schematically in FIG. 4, for connection in external electrical circuits, the general nature of which will be described hereinafter, and the trunnion 19 is formed with appropriate longitudinal passages, such as shown at 25 and 26 to accommodate wires extending from the rings forwardly to particular energized components of the transformer.

A roller bearing 27 of suitable particular form supports the trunnion 19 in surrounding relation at the rear support section 12, with this bearing assembly on the end of an adjusting screw 28 depending from an overhead frame, which also has been omitted for convenience and in view of the fact that this type of support is quite common. A drum 29 is disposed about the next longitudinal section of the shaft 10, with said drum having a rear circular wall 30 in which a center aperture is provided for passage of the shaft. An insulating pad 31 overlies the flanged end 32 of the trunnion 19, and the rear wall 30 of the drum is brought against such pad, with the shaft sealed in the aperture of such wall by a sealing ring 33. The main body of the drum extends forwardly from such rear wall, the latter being a separate plate secured to the former in sealed relation as shown at 34, as a coaxial cylinder over its major extent, and the forward end portion of this drum body member is formed to provide a frusto-conical wall section 35 and, finally, a front radial wall 36 in which there is a center aperture 37. As illustrated, the outer surface of the drum 29 is provided with annular ribs 38 over its entire side wall.

At the rear interior of the drum, a flanged bushing 39 is keyed on the shaft 10 with its flanged end abutting the inner surface of the drum wall 30, and the transformer trunnion pad 40 is engaged about the flanged end of this bushing and projects rearwardly similarly to the drum wall. Seal rings 41 are interposed between such pad 40 and the wall 30, and a plurality of screws 42 are passed through the flanged end 32 of the trunnion 19 and the drum wall into engagement with the pad, whereby such screws serve to unite the thus interengaged components. A transformer including an iron core and windings thereabout is supported in the cylindrical portion of the drum 29. The specific form of this transformer is not critical, and it will suffice here to understand that the same includes a closed laminated iron core 43 about which a series of primary windings and alternating single turn secondary pieces are distributed. The elements 44 in FIG. 1 are such secondary turns the connections of which will be described; the several primary windings have their ends respectively connected to conductor rings 45 and 46 supported on the rear wall of the drum and shown fragmented for convenience.

An electrical connection is made between the rear current supply ring 24 and the drum ring 45 by means of an insulated terminal post 47 extending from the latter through the drum wall in sealed relation and an insulated conductor 48 leading from such post to the ring 24, partially through the rear trunnion in the passage 25 thereof. The other drum conductor ring 46 is similarly connected through a further terminal post 49 and conductor 50 to the other current supply ring 23.

The ends of the several secondary turns 44 which are innermost or adjacent the center shaft 10 are commonly joined to an inner closed terminal pad 51 about the shaft, while the other ends of these secondary turns are joined to an outer and also closed terminal pad 52 in spaced relation about such inner pad. It will be noted that these terminal pads are at the forward end of the core-winding assembly and that the rear end is supported on the bushing 39, with a space or gap 53 between the shaft 10 and the major extent of the core-winding assembly.

The center shaft 10 has an integral collar 54 against which the inner terminal pad 51 is abutted, and an inner sleeve conductor 55 having a seat to receive such collar is secured to and projects forwardly from this terminal pad to the outer end of shaft 10. A coaxial spaced outer conductor 56 extends from a point inwardly of the outer end of and insulated from the inner conductor 55 to a flanged end 57 secured to the outer terminal pad 52, and the forward wall 36 of the drum 29 is secured as shown at 58 to such flanged end of the outer conductor, with a seal ring 59 between the two. A front bearing 60 receives and supports the outer conductor 56 forwardly of the drum, with this bearing being fastened to the end of a further adjusting screw 61 depending similarly as the screw 28 carrying the rear bearing. Bearing 60 is insulated from the housing and screw 61, and suitable insulation is preferably interposed between the co-axial conductors.

An inner electrode 62 is fitted on the forward or outer end of the outer conductor 56, while an end cap 63 carrying an outer conductor 64 is fastened to and about the outer end portion of the inner conductor 55. An insulating disc 65 is positioned between the two electrode rings, and the latter are contoured as shown for engagement with a tube blank T.

Returning to the rear end of the welder, the mount of bearing 27 carries a lower bracket extension 66 on which there is supported an electric motor 67 and speed reduction unit 68 which drives a clutch and sprocket 69. A chain 70 is engaged about this drive sprocket and the sprocket 16 secured to the rear end of the welder shaft 10, so that this electric motor drive can be utilized to rotate the welder and hence the electrode rings for the purpose of trimming the latter in a maintenance operation. Normally, the tube blank is advanced longitudinally, as in a tube mill, and the engagement of the electrode rings therewith of course causes the entire welder to rotate in the front and rear support bearings, with the clutch of sprocket 69 of course disengaged.

It should now be noted that the drum enclosing the core-winding portion of the welder is hermetically sealed. This drum is filled in suitable manner with an inert cooling liquid to the approximate level indicated by the line 71, whereby a substantial portion of the core-winding assembly will be immersed in this liquid charge. The liquid is one which will vaporize at the operating temperatures of the transformer, and it will be clear that the core-winding assembly will in effect be rotated through the liquid bath which is retained by gravity in the lower portion of the drum, the speed of rotation being insufficient to centrifuge the same.

The core-winding assembly thus effectively being rotated in partially immersed condition has an irregular periphery, whereby considerable turbulence of the liquid is produced and some is carried upwardly out of the bath to drain back over the exposed portions of the assembly. Considering simply the drum for the moment, the heat generated in the core and windings vaporizes the liquid and this vapor tends to condense on the inner surface of the drum which is well suited to dissipate the heat thus transferred to the same. That is, the rib formation of the outer surface of the drum affords an extremely large surface area from which the heat is dissipated. The condensed liquid is of course returned to the bath.

Figure 3:
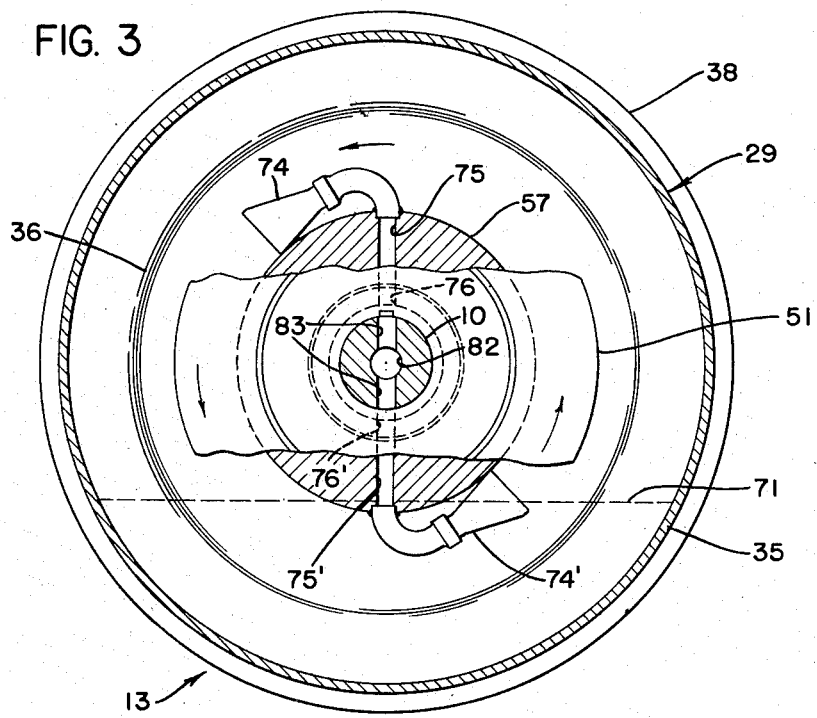
FIG. 3 is a further transverse section taken approximately on the line 3—3 in FIG. 1.

Since it is also desirable to extract heat from the co-axial conductor assembly, the transformer is further provided with means for circulating a portion of the liquid through the same. Such means comprises first and second scoops 74 and 74' mounted in diametrically opposite radial openings 75 and 75' in the flanged end portion 57 of the outer conductor 56. The direction of rotation is shown by the arrows in FIG. 3 from which it will also be apparent that the scoops move through the liquid bath to collect and elevate portions of the liquid. The radial holes 75 and 75' in the outer conductor are respectively in register with further holes 76 and 76' in the inner conductor 55.

The inner wall of the conductor 55 is formed with first and second helical grooves 78 and 79 respectively communicating at their inner ends with the holes or ports 76 and 76′ and progressing along the inner conductor to an outer end annular groove 80. At the occurrence of such outer annular groove, the center shaft 10 is provided with radial holes 81 leading to a bore 82 therein capped at its outer end and extending inwardly to a pair of discharge ports 83 within the interior of the core-winding assembly in drum 29. As the welder rotates, then, each scoop 74 and 74′ picks up a charge of the liquid and, as it moves upwardly above the center, the thus collected charge therein flows by gravity interiorly through the connected radial passages in the outer and inner conductors to one of the helical grooves. The two helical grooves 78 and 79 are accordingly respectively supplied with liquid from scoops 74 and 74′ and serve to pump the liquid forwardly along the conductor 55, because of the rotation of the same relative to the liquid, to the outer end groove 80 from which it proceeds to and along the interior of the shaft for return to the drum 29 through the inner discharge ports 83. The double scoop and helix arrangement is preferred for added pumping capacity with various designs of scoops capable of being employed depending on the amount of liquid coolant required and the height to which it must be raised. It will also be noted that the inner surface of the inner conductor 55 is provided with a longitudinally extending key 84 to lock the same on the shaft 10.

Figure 4:
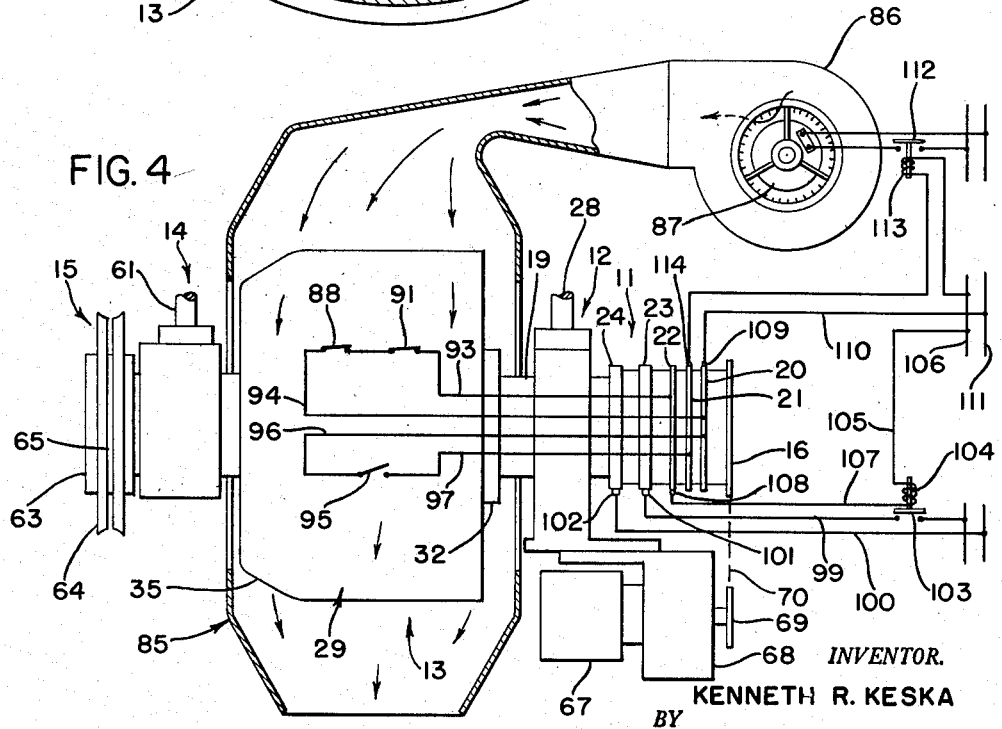
FIG. 4 is a simplified elevational view of the transformer having schematically superimposed thereon the electrical control system, with the transformer here shown as enclosed by a hood through which air is circulated also in accordance with the invention.

It is preferred that provision be made for the exterior of the drum 29 to be exposed to a flow of cooling fluid, thereby to assist in dissipation of the heat therefrom and enhance the efficiency of the transformer cooling. In FIG. 4, the transformer drum 29 has accordingly been shown as surrounded by a housing 85 through which air is forced by a connected blower 86. Such blower is driven by an electric motor 87, and FIGS. 2 and 4 show an electrical control system in which this blower motor is included.

Figure 2:
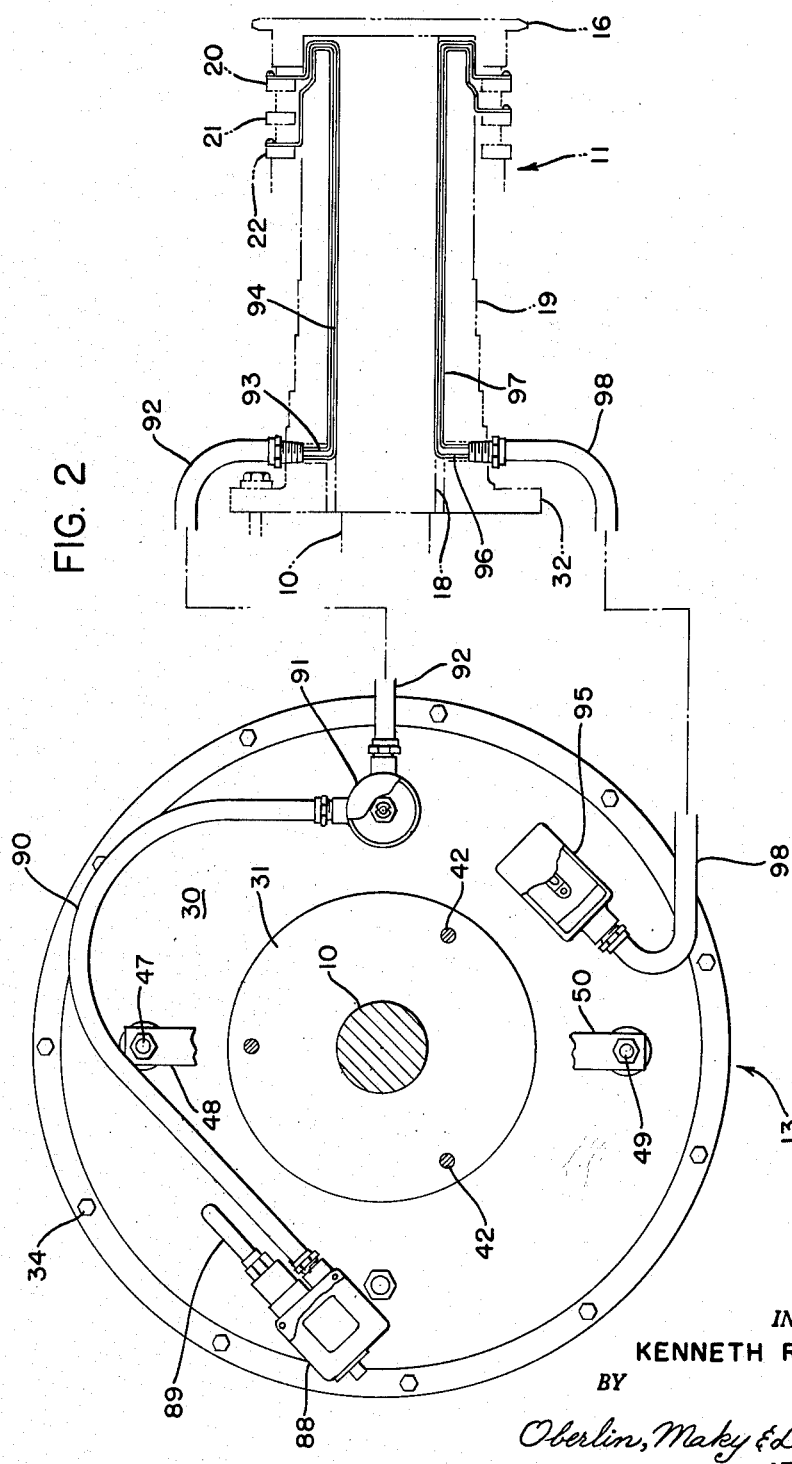
FIG. 2 is a transverse section taken approximately on the line 2—2 in FIG. 1 and having added schematically and in phantom elevation the supply end of the transformer to show one arrangement of the electrical connections of the control components which appear.

In FIG. 2, a pressure switch 88 is shown mounted at the exterior of the rear drum wall 30, with a fluid connection 89 from the same extending through the wall to the drum interior. This pressure switch is of any suitable type, such as a Square D Co. pressure switch, class 9012, and wires extend from the contacts thereof through a conduit 90 which is, in this case, connected to the housing of a further control component 91. The latter is a thermostatic switch also mounted on the rear drum wall at an aperture for communication with the drum interior. This switch may, for example, be a Fenwal Inc. thermal switch, series 17100, and here functions as a high temperature safety as will be described below. A conduit 92 extends from the switch to the rear trunnion 19, with a pair of wires 93 and 94 therein respectively connected to the contact rings 22 and 20. As will be evident from FIG. 4, the pressure switch 88 is connected within the housing of the temperature switch 91 to be in electrical series relation with the contacts of the latter, whereby opening of either of these normally closed switches opens a circuit between the contact rings 20 and 22.

Another thermostatic switch 95 is also mounted on the rear wall 30 of the drum 29 and wires 96 and 97 respectively lead from the contacts of the same through a conduit 98 to the contact rings 20 and 21.

As shown in simplified form in FIG. 4, current is supplied to the transformer through wires 99 and 100 and brushes 101 and 102 respectively engaged with the current supply rings 23 and 24. A solenoid operated, normally open switch 103 is provided in this supply circuit, with the solenoid coil 104 thereof being connected at one side by a wire 105 to supply conductor 106 and, at its other side, through a wire 107 and brush 108 to the welder ring 22, through the contact ring 22, both of the switches 88 and 91, the contact ring 20, the brush 109 engaged with the latter, and a wire 110 connecting the brush 109 to the other supply conductor 111. Accordingly, if either the pressure or temperature safety switches 88 and 91, respectively, opens, or any part of the circuit opens, solenoid coil 104 will be deenergized. The settings of the pressure and safety thermostat switches are such that this circuit will be opened in the event of excessive pressure or temperature within the transformer drum to interrupt the current supply to the transformer. A circuit employing parallel, normally open contacts 88 and 91 could also be used to provide such pressure and temperature protection.

The blower motor 87 is also automatically controlled by normally open solenoid operated switch contacts 112 in its energization circuit. The coil 113 of this solenoid is connected at one side to the supply conductor 106 and, at its other side, to the welder contact ring 21 through brush 114. When the temperature switch 95 closes, the solenoid 113 is energized through the contact ring 21, switch 95, the contact ring 20, brush 109, and wire 110 to the other supply conductor 111. This temperature switch will be set at a lower value to complete such circuit when the drum temperature reaches a predetermined point at which it would be desirable to assist in the dissipation of the heat thereof by the blower produced flow of air over the drum. The blower thus will not be continuously operative but employed only when necessary to maintain the desired cooling efficiency. By employing two thermostatic switches in this control circuit, with appropriate ring connections, it is possible to use a two speed motor with the blower.

It has already been noted that the liquid used for vapor cooling should be inert, that is, a liquid which will not react with any of the materials used in the transformer and contacted by the same; it should of course also be a dielectric or non-conducting. Among the liquids satisfying such basic requirements and with, of course, a vapor point suitably related to the operating temperatures of the transformer for vaporization in the intended manner, it is also preferred that the particular liquid exhibit good thermal and chemical stability, nonflammability, and a high rate of heat transfer. The quantity of such cooling agent in the transformer should provide appreciable immersion of the core-winding assembly, preferably on the order of from 25 to 40%, and not exceeding 50%, so that there is provided a definite liquid bath through which the current carrying assembly is effectively rotated in operation.

With the foregoing conditions observed, and the liquid charge contained in a hermetically sealed enclosure for the current-carrying assembly, extremely high cooling efficiency is realized, with the structural combination and its operation considered distinctive. It will for example be clear that the new transformer is basically quite different from an arrangement in which the conductor assembly or device is substantially fully immersed in liquid dielectric, since in this last case rotation of the device even if occurring would have little if any significance insofar as vapor cooling is concerned, whereas such characteristic is important and has beneficial significance in the new combination. As the conductor or winding assembly is rotated in partially immersed condition as disclosed herein, liquid will tend to cling to the surfaces moving out of the bath for distribution thereover while the surfaces remain exposed, for enhanced vaporization, and there is of course continual movement or agitation of the bath. Also, liquid is available at the "hot spots," or points requiring cooling, thereby maintaining a lower uniform operating temperature.

It has been disclosed herein that the outer surface of the drum can be subjected to a forced flow of air, when and as desired or needed, and it will be apparent that such added heat dissipating effect could also be realized by means of an external water spray. The specific form of the transformer can also vary, not only in the nature and disposition of the windings as previously mentioned, but in the conductor assembly and further respects as well.

Other modes of applying the principle of the invention may be employed, change being made as regards the details described, provided the features stated in any of the following claims or the equivalent of such be employed.

I, therefore, particularly point out and distinctly claim as my invention:

1. A rotary welder comprising transformer means including an inner winding assembly and fluid sealed housing means thereabout in spaced relation, rotary electrode means, conductor means for connecting said electrode means to the transformer means and including a fluid passage, means for mounting the transformer, conductor and electrode means for rotation as a unit on a substantially horizontal axis, a charge of a liquid dielectric cooling agent in the housing means forming a bath in which the inner winding assembly is partially immersed, the inner winding assembly being rotated in such partially immersed condition in operation of the welder and the heat normally generated by the transformer means producing vaporization of the liquid, and means for forcing some of the liquid from the bath through the passage of the conductor means from which it is returned to the housing means.

2. A rotary welder comprising transformer means including an inner winding assembly and fluid sealed housing means thereabout in spaced relation, rotary electrode means, conductor means between the transformer and electrode means and having a fluid passage which extends from the housing means through the conductor means and back to the housing means, means for mounting the transformer, conductor and electrode means for rotation as a unit on a substantially horizontal axis, a charge of a liquid dielectric cooling agent in the housing means forming a bath in which the inner winding assembly is partially immersed, the inner winding assembly being rotated in such partially immersed condition in operation of the welder and the heat normally generated by the transformer means producing vaporization of the liquid, and pump means for forcing some of the liquid from the bath through the passage of the conductor means, said pump means being operated by rotation of the welder.

3. In a rotating welding transformer including a winding assembly, conductor means extending from said assembly, and rotary electrodes connected to the conductor means; a drum surrounding the winding assembly in spaced relation, a charge of liquid coolant in the drum in which the winding assembly is partially immersed, means defining a passage extending from the drum through the conductor means and back, and pump means in the transformer operative to pump liquid from the drum through the passage in the conductor means.

4. A rotating welding transformer as set forth in claim 3 wherein said pump means is operated by the rotation of the transformer.

5. A rotating welding transformer as set forth in claim 4 wherein the pump means includes collector means rotating through the liquid in the drum and operative to withdraw liquid therefrom for delivery to the conductor means.

6. A rotating welding transformer as set forth in claim 3 wherein the normal level of liquid in the drum is below the center of the winding assembly, and the discharge of the liquid from the conductor means is central of said assembly.

7. In electrical welding transformer construction, a winding assembly, means for supporting said winding assembly for rotation during use about a substantially horizontal axis, a fluid-tight enclosure in spaced surrounding relation about said winding assembly, and a charge of a liquid dielectric in said enclosure and forming a bath therein in which the winding assembly is partially immersed, said liquid being vaporizable by the heat normally generated by the winding assembly when energized, with consequent cooling effect on the assembly, the enclosure being designed to condense the vapor on portions thereof above the bath, and roller electrodes connected to said winding assembly for rotating the same in such partially immersed condition by engagement of said electrodes in use with a moving workpiece.

8. Transformer construction as set forth in claim 7 including circuit means for energizing the rotating winding assembly, and circuit breaker means for interrupting said circuit means in response to the occurrence of a predetermined excessive pressure within the enclosure.

9. Transformer construction as set forth in claim 7 including circuit means for energizing the rotating winding assembly, and circuit breaker means for interrupting said circuit means in response to the attainment of a predetermined excessive temperature in the winding assembly.

10. Transformer construction as set forth in claim 7 including means for circulating cooling fluid over the exterior of the enclosure, and means for controlling operation of said last-named means in response to heat produced by the winding assembly.

11. Transformer construction as set forth in claim 7 wherein at least half of the winding assembly is above the normal level of the bath of the liquid dielectric when the assembly is not rotating.

12. Transformer construction as set forth in claim 7 including means for circulating fluid over the exterior of said enclosure to extract heat therefrom.

References Cited in the file of this patent

UNITED STATES PATENTS

| | | |
|---|---|---|
| 1,502,140 | Hunter | July 22, 1924 |
| 1,691,696 | Baum | Nov. 13, 1928 |
| 2,083,611 | Marshall | June 15, 1937 |
| 2,288,341 | Addink | June 30, 1942 |
| 2,419,837 | Hugin | Apr. 29, 1947 |
| 2,553,291 | Barr | May 15, 1951 |
| 2,636,921 | Marbury | Apr. 28, 1953 |
| 2,824,947 | Billetter | Feb. 25, 1958 |
| 2,854,594 | Philippovic | Sept. 30, 1958 |
| 2,964,610 | Mackey | Dec. 13, 1960 |